(12) United States Patent
Odachowski

(10) Patent No.: US 6,807,743 B2
(45) Date of Patent: Oct. 26, 2004

(54) SQUARE LEVEL

(76) Inventor: Mark Odachowski, 12414 Old Bridge Rd., Ocean City, MD (US) 21842

( * ) Notice: Subject to any disclaimer, the term of this patent is extended or adjusted under 35 U.S.C. 154(b) by 0 days.

(21) Appl. No.: 10/701,330

(22) Filed: Nov. 4, 2003

(65) Prior Publication Data

US 2004/0172840 A1 Sep. 9, 2004

Related U.S. Application Data

(60) Provisional application No. 60/499,655, filed on Sep. 3, 2003.

(51) Int. Cl.$^7$ .................................................. B43L 13/00
(52) U.S. Cl. ............................. 33/465; 33/451; 33/374; 33/478
(58) Field of Search ........................... 23/451–452, 456, 23/458, 465, 478

(56) References Cited

U.S. PATENT DOCUMENTS

| | | | |
|---|---|---|---|
| 120,675 A | 11/1871 | Shelley | |
| 339,287 A | 4/1886 | Gates | |
| 732,827 A | 7/1903 | Chambers | |
| 1,014,402 A | 1/1912 | Larsen | |
| 1,210,370 A | 12/1916 | Dvorak | |
| 1,359,758 A | * 11/1920 | Slavik | 33/495 |
| 1,806,396 A | 5/1931 | Hartwell | |
| 1,982,178 A | * 11/1934 | Barnet | 33/451 |
| 2,093,341 A | * 9/1937 | Reiche | 446/104 |
| 2,554,704 A | * 5/1951 | Hoppe | 446/123 |
| 2,559,961 A | 7/1951 | Howell | |
| 2,728,989 A | 1/1956 | Laggren | |
| 2,741,030 A | * 4/1956 | Wise | 33/340 |
| 2,878,569 A | 3/1959 | Metrulis | |
| 3,783,518 A | 1/1974 | Jones | 33/75 |
| 4,194,295 A | * 3/1980 | Simuro et al. | 33/458 |
| 4,317,289 A | 3/1982 | Conn | 33/498 |
| 4,377,916 A | * 3/1983 | Komiya | 446/487 |
| 4,822,315 A | * 4/1989 | Ben-Gal et al. | 446/102 |
| 5,459,935 A | 10/1995 | Paulson | 33/451 |
| 5,713,135 A | * 2/1998 | Acopulos | 33/451 |
| D460,700 S | * 7/2002 | Marletta | D10/69 |
| 6,443,794 B2 | * 9/2002 | Oren et al. | 446/85 |
| 6,643,942 B1 | * 11/2003 | Russell | 33/459 |
| 2001/0049879 A1 | * 12/2001 | Moore | 33/376 |
| 2002/0121025 A1 | * 9/2002 | Leite | 33/374 |
| 2004/0040169 A1 | * 3/2004 | Davis | 33/640 |

* cited by examiner

Primary Examiner—G. Bradley Bennett
Assistant Examiner—Yaritza Guadalupe
(74) Attorney, Agent, or Firm—Larry J. Guffey

(57) ABSTRACT

An improved tool comprising a carpenter's combined level and square includes: (a) a first elongated, straight section having distal and proximate ends and a centerline therebetween, with the proximate end having a flat surface whose upper part forms a 45 degree angle with the section's centerline, (b) a first leveling bubble fixed in this first section, (c) a second elongated, straight section having distal and proximate ends and a centerline therebetween, with the proximate end having a flat surface whose upper part forms a 135 degree angle with the section's centerline, and with the second section proximate end being proximate the first section proximate end, (d) a second leveling bubble fixed in this second section, (e) a coupling means having a bottom portion that is connected to the first section proximate end and a top portion that is connected to the second section proximate end and a connecting rod that is configured so as to connect these portions and allow them to independently rotate about the rod, the centerline of the rod being perpendicular to both proximate ends and located such that it intersects the section centerlines, and (f) a ball detent fixed in one of the proximate ends of the straight sections.

6 Claims, 4 Drawing Sheets

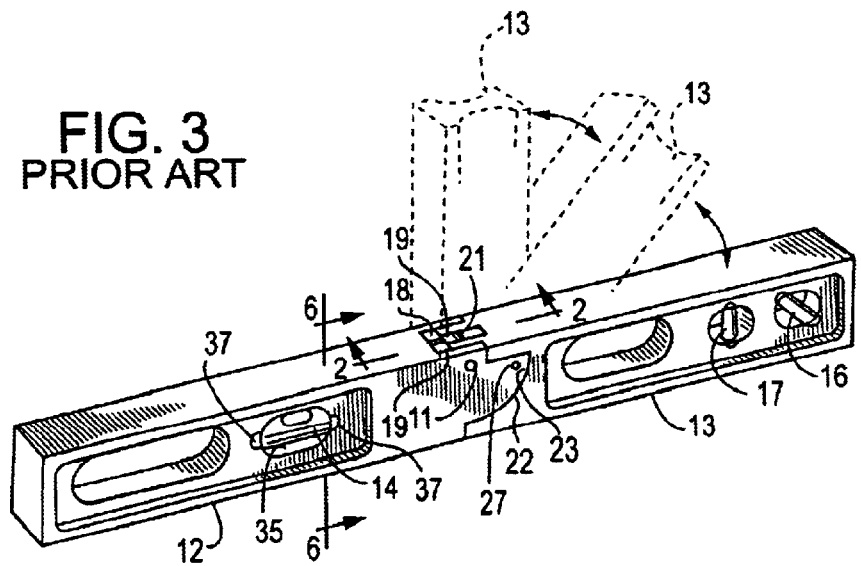

SQUARE LEVEL

CROSS-REFERENCE TO RELATED APPLICATION

This application claims the benefit of U.S. Provisional Patent Application No. 60/499,655, filed Sep. 3, 2003.

BACKGROUND OF THE INVENTION

1. Field of the Invention

The present invention generally relates to geometrical instruments for determining levelness and ninety degree corners. More particularly, this invention relates to a combination level and square for use by craftsmen.

2. Descriptiom of the Related Art

Craftsmen such as carpenters, plumbers, electricians, and contractors, for example, repeatedly make use of several basic tools in their jobs. Some of the most commonly used tools include scales, squares, levels, straight edges, among others.

There have been numerous attempts in the past to combine several of these commonly used tools into one for convenience. For example, U.S. Pat. No. 732,827, issued to Chambers, discloses a hinged level whose two parts can move in the plane of the level so as to be oriented with respect to each other at angles from 0 to 90 degrees. See FIG. 1.

U.S. Pat. No. 1,210,370, issued to Dvorak, discloses a combination level and square which incorporates an alternative hinge that also allows the two parts of such a level to be oriented with respect to each other at angles from 0 to 90 degrees. See FIG. 2.

U.S. Pat. No. 4,317,289, issued to Conn, and U.S. Pat. No. 5,459,935, issued to Paulson, disclose similar such combinations of a level and a square. See FIGS. 3 and 4.

Meanwhile, U.S. Pat. No. 4,481,720, issued to Sury, discloses a combined level and protractor in which the level vials can be recalibrated. A protractor arm pivots from a recess within the main body to a 90 degree position. A stop structure including a thumb wheel and a lead screw shaft can be used to fix the angular position of the protractor arm.

Other prior patents showing multiple-section tools which may be used as levels or squares include U.S. Pat. Nos. 120,675, 339,287, 1,014,402, 1,806,396, 2,559,961, 2,728, 989, 2,878,569, and 3,783,518.

All of these combination tools seem to share two common traits: (a) the two movable parts of the tool are hinged in such a manner that their motion is in the same plane (e.g., the x-y plane shown in FIG. 2) as that which is defined by the plane of use of the tool; the manner of hinging of these parts does not allow for motion outside of the such tool's intended plane of use (i.e., there is no motion in the z-plane of FIG. 2), and (b) the hinging of the two parts is such that they may be oriented with respect to each other at any angle between 0 to 90 degrees. These traits prove to be important is considering the novelty of the present invention.

Despite a long recognized need for a tool that offers the combined functions of a level and a square, and despite considerable prior art directed towards such a combination tool, such a tool has not yet accepted for wide spread use in the construction industry. Accordingly, there remains a need for an improved device combining both the functions of a level and a square.

OBJECTS AND ADVANTAGES

There has been summarized above, rather broadly, the prior art that is related to the present invention in order that the context of the present invention may be better understood and appreciated. In this regard, it is instructive to also consider the objects and advantages of the present invention.

An object of the present invention is to provide an improved, combination level and square that will overcome the user problems which have prevented the wide spread use of such devices in the construction industry.

Another object of the present invention is to provide an improved, combination level and square that has a more durable and reliable joint than the simple hinge joint which has been used in all prior art version of such devices.

A still other object of the present invention is to provide an improved, combination level and square that is easy to use and can withstand the sometimes extreme physical demands made on it by workers in the construction industry.

A further object of the present invention is to provide an improved, combination level and square that is constructed so as to continue to function properly and accurately, despite weather conditions and general wear and tear.

Another object of the present invention is to provide an improved, combination level and square whose hinging mechanism can resist the twisting and bending moments applied to the tool during mishandling and transport.

A still further object of the present invention is to provide an improved, combination level and square whose accuracy is maintained despite constant wear and tear on its components.

Another object of the present invention is to provide an improved, combination level and square in which the level may be quickly and easily turned to or returned from the 90 degree square position to the aligned position simply by a quick movement by the hand of the user and without the release of any extensive fasteners, locking devices, etc.

Other objects and advantages of the present invention will become readily apparent as the invention is better understood by reference to the accompanying drawings and the detailed description that follows.

SUMMARY OF THE INVENTION

The present invention is generally directed to satisfying the need set forth above and the problems identified with prior craftsman's tools that function as a combination level and square.

In a preferred embodiment, the present invention takes the form of a combined carpenter's level and square. It comprises: (a) a first elongated, straight section having distal and proximate ends and a centerline therebetween, with the proximate end having a flat surface whose upper part forms a 45 degree angle with the section's centerline, (b) a first leveling bubble fixed in this first section, (c) a second elongated, straight section having distal and proximate ends and a centerline therebetween, with the proximate end having a flat surface whose upper part forms a 135 degree angle with the section's centerline, and with the second section proximate end being proximate the first section proximate end, (d) a second leveling bubble fixed in this second section, (e) a coupling means having a bottom portion that is connected to the first section proximate end and a top portion that is connected to the second section proximate end and a connecting rod that is configured so as to connect these portions and allow them to independently rotate about the rod, the centerline of the rod being perpendicular to both proximate ends and located such that it intersects the section centerlines, and (f) a ball detent fixed in one of the proximate ends of the straight sections.

This tool is characterized by the fact that its second section has one of two fixed orientations with respect to its first section. When in its first position, the centerlines of the sections are aligned with each other so that their outer surfaces form straight lines. Meanwhile, when the second section has been rotated 180 degrees about the tool's connecting rod the tool assumes its second position, the centerlines of the sections then form a ninety degree angle with one another so that the tool may be used as a square.

Other embodiments of the present invention may become readily apparent as the invention is better understood by reference to the accompanying drawings and the detailed description that follows.

BRIEF DESCRIPTION OF THE DRAWINGS

FIG. 3 is a perspective view of the prior art, hinged, two section level of U.S. Pat. No. 4,317,289.

FIG. 4 is a perspective view of the prior art, hinged, combined level and square of U.S. Pat. No. 5,459,935.

DESCRIPTION OF THE PREFERRED EMBODIMENT

Figure 1:
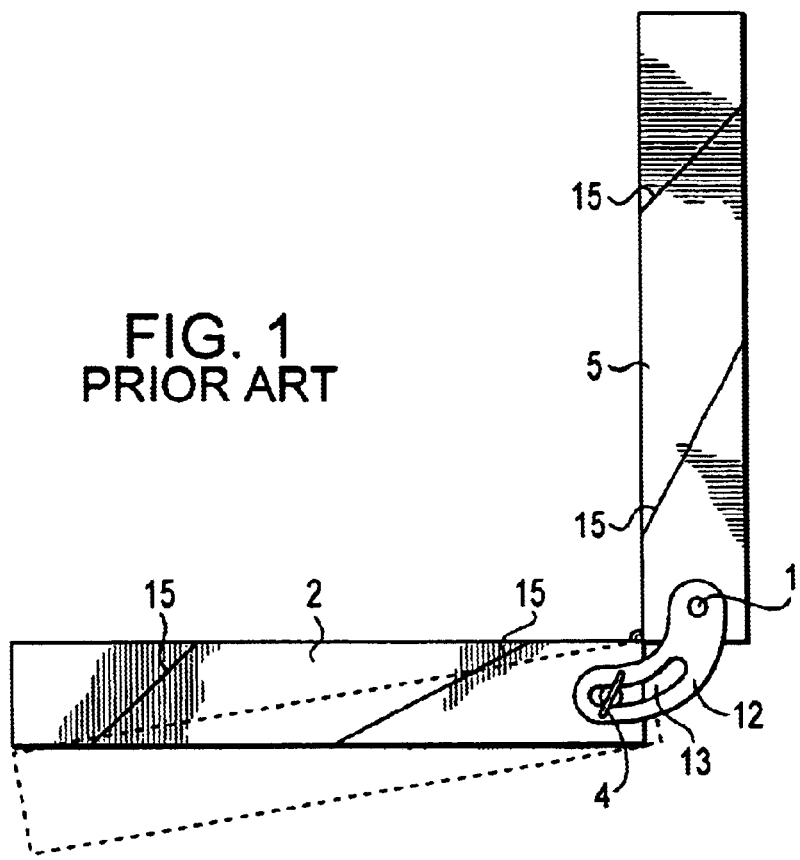
FIG. 1 is a top view of the prior art, hinged combination tool of U.S. Pat. No. 732,827.
Figure 2:
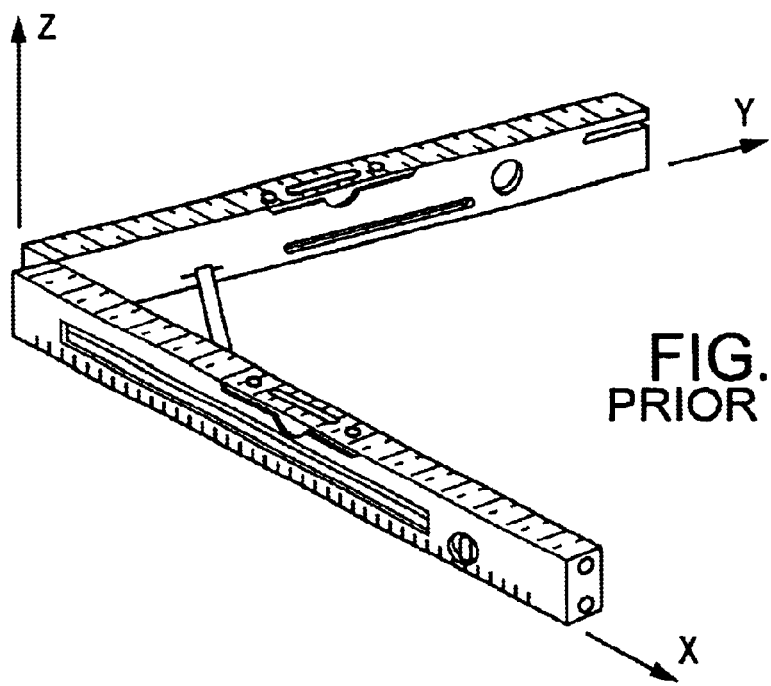
FIG. 2 is a perspective view of a the prior art, hinged, combined level and square of U.S. Pat. No. 1,210,370.
Figure 5:
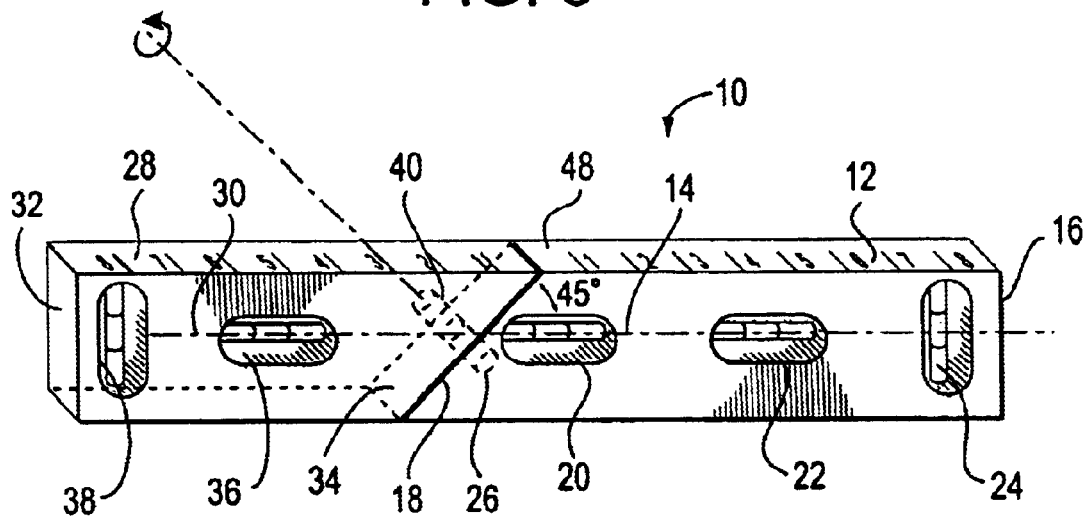
FIG. 5 is a perspective view of an embodiment of the present invention that is oriented so that both of its sections are aligned so as to form a straight line, with a cutaway portion that shows the coupling means between the sections.

Referring now to the drawings wherein are shown preferred embodiments and wherein like reference numerals designate like elements throughout, there is shown in FIG. 5 a perspective view of an embodiment of the present invention in the form of an improved, combination level and square 10.

This embodiment includes a first elongated, straight section 12 having a centerline 14 and specified dimensions of height, width and depth, along with a distal end 16 and a proximate or adjoining end 18. One or more leveling or level bubbles 20, 22, 24 are located in the section. Its adjoining end 18 is flat and its upper part forms a 45 degree angle with the centerline 14 of this section. The bottom portion 26 of a coupling means is fixed in the adjoining end 18 and is located at the point where this section's centerline 14 intersects the surface of the adjoining end 18. This coupling means has a central connecting rod or pivot pin that extends perpendicularly from the adjoining end 18.

A second elongated, straight section 28 aligns with and is pivotally attached via the coupling means to this first section 12. This second sections also has a centerline 30, distal 32 and adjoining 34 ends, and similar specified dimensions of height, width and depth as the first section 12. This section's adjoining end 34 is complimentary to the first section's adjoining end 18 in that it is flat and its upper part forms a 135 degree angle with the centerline 30 of the section, so that these adjoining ends 18, 34 can be in continuous contact. Level bubbles 36, 38 are also located in this second section 28.

Matching the bottom portion 26 of the coupling means located in first section 12 is the top portion 40 of the coupling means which is fixed in the adjoining end 34 of the second section 28. It 40 extends perpendicularly into the face of the second section adjoining end 34 and is also located at the point where the section's centerline 30 intersects the surface of the second section adjoining end 34.

Figure 6:
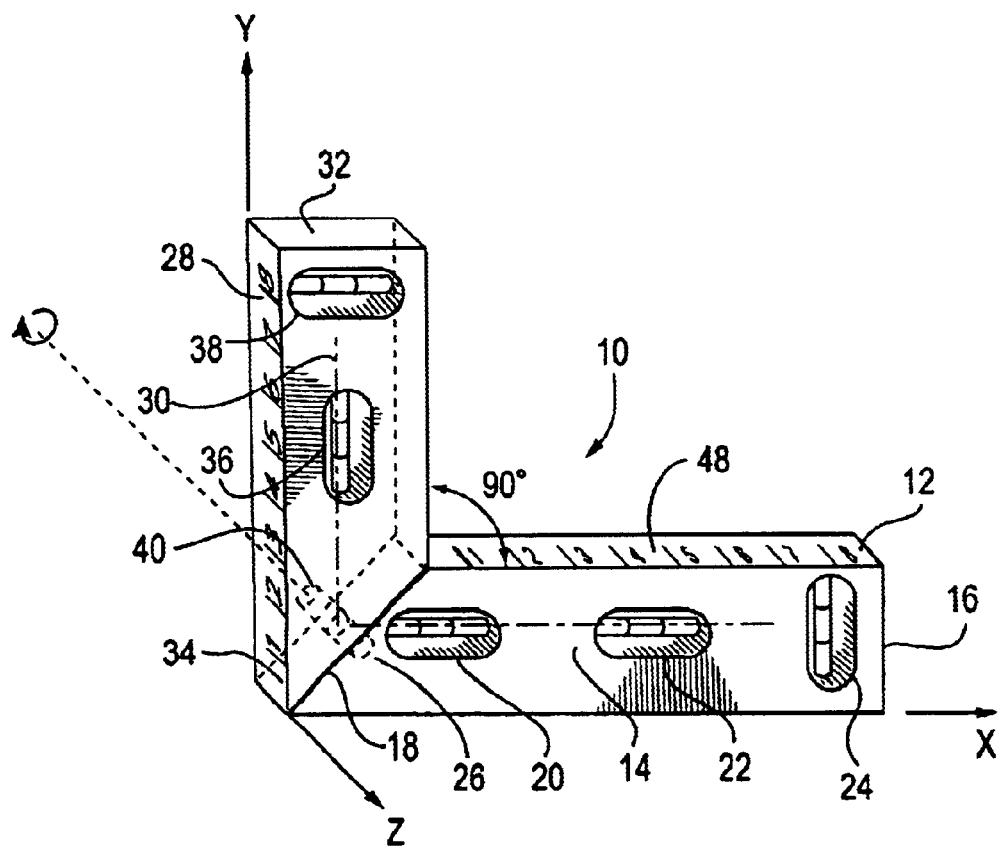
FIG. 6 is a perspective view of an embodiment of the present invention that is oriented so that its sections are aligned at right angles to each other so that it may be used as a square, with a cut-away portion that shows the coupling means between the sections.

The combination of the appropriately configured, adjoining ends 18, 34 with this coupling means make it possible to rotate the second section 28 with respect to the first section 12. By rotating the second section 180 degrees, the centerlines 14, 30 of these sections are now seen to make a ninety degree angle with each other so that the tool 10 in this configuration may also function as a square. See FIG. 6. The motion of the second section distal end 32 is seen to be fully three dimensional in that it moves in the z-plane as well as the x-y plane as this section rotates about the connecting rod that fits through the section's embedded top portion 40.

Figure 7:
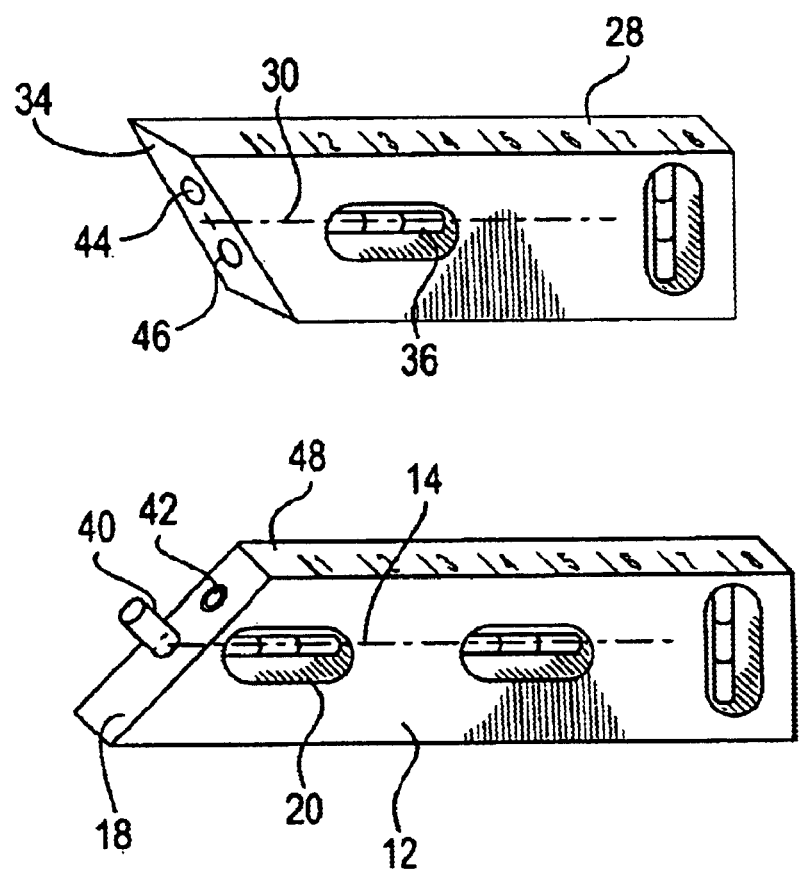
FIG. 7 is a perspective view of the adjoining ends of a preferred embodiment of the present invention when these ends have been separated so as to show the sections coupling and latching means.

To lock this tool into either it's square or its straight line configuration, a suitable latching mechanism is used. For example, a spring-loaded detent ball 42 may be situated in the adjoining end 18 of the first section. Two appropriate configured and located cavities 44, 46 are located in the adjoining end 34 of the second section so as to allow the detent ball to operate so as to lock the sections so that they form a straight line when the detent ball 42 is in the first cavity 44 and to lock the sections so that they form a right angle when the detent ball 42 is in the second cavity 46. See FIG. 7.

At first glance, the limited flexibility in orientation of the sections of the present invention, as compared to that seen with the hinged sections shown in the similar prior art inventions, may seem like a detriment. However, this proves not to be the case, since any loss in flexibility of orientation is more than made up for by the superior sturdiness, reliability and ease-of-use achieved with the pivoting mechanism of the present invention.

Additionally, it can be seen that the present invention, with its simple, enclosed pivoting mechanism, is much easier to construct than the similar, prior art inventions which utilize assorted hinging mechanisms.

To aid the usefulness of this combination tool, suitable numbering indicia 48 are added to the edges of the two sections.

While the present invention has been described in terms of a preferred embodiment, it is evident that many alternatives, modifications, and variations will be apparent to those skilled in the art in light of the foregoing teachings. Accordingly, the present invention is intended to embrace all such alternatives, modifications and variations as fall within the spirit and scope of the claims that will follow in the regular patent application that will be filed in association with this provisional application filing.

I claim:

1. A combined carpenter's level and square comprising:
   a first section having distal and proximate ends and a centerline therebetween, with said proximate end having a flat surface with a portion that forms a 45 degree angle with said centerline,
   a first leveling bubble fixed in said first section,
   a second section having distal and proximate ends and a centerline therebetween, with said proximate end having a flat surface with a portion that forms a 135 degree angle with said second section centerline, and with said second section proximate end being adjacent said first section proximate end, a second leveling bubble fixed in said second section, a means for coupling that joins said flat surfaces and allows said sections to rotate about an axis that extends perpendicular to said surfaces and passes through a point located on said centerlines of said sections, and a means for latching said sections so that said sections are oriented with respect to each other in either one of two specified orientations.

2. A combined carpenter's level and square as recited in claim 1, wherein said two specified orientations are with said centerlines aligned so as to form a straight line and with said centerlines intersecting at a 90 degree angle.

3. A combined carpenter's level and square as recited in claim 1, further comprising measurement indicia proximate an edge of said sections.

4. A method for making a combined carpenter's level and square, said method comprising the steps of:

assembling a section having distal and proximate ends and a centerline therebetween, with said proximate end having a flat surface with a portion that forms a 45 degree angle with said centerline, fixing a first leveling bubble in said first section, assembling a second section having distal and proximate ends and a centerline therebetween, with said proximate end having a flat surface with a portion that forms a 135 degree angle with said second section centerline, fixing a second leveling bubble in said second section, bringing said flat surfaces proximate one another, coupling said flat surfaces in a manner that allows said sections to rotate about an axis that extends perpendicular to said surfaces and passes through a point located on said centerlines of said sections, and providing a means for latching said sections so that they are oriented with respect to each other in either one of two specified orientations.

5. A method for making a combined carpenter's level and square as recited in claim 4, wherein said two specified orientations are with said centerlines aligned so as to form a straight line and with said centerlines intersecting at a 90 degree angle.

6. A method for making a combined carpenter's level and square as recited in claim 5, further comprising the step of placing measurement indicia proximate an edge of said sections.

* * * * *